US008819272B2

(12) United States Patent
Song

(10) Patent No.: US 8,819,272 B2
(45) Date of Patent: Aug. 26, 2014

(54) MULTIPROCESSOR COMMUNICATION NETWORKS

(75) Inventor: William S. Song, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 625 days.

(21) Appl. No.: 12/703,938

(22) Filed: Feb. 11, 2010

(65) Prior Publication Data

US 2014/0153399 A1    Jun. 5, 2014

(51) Int. Cl.
*G06F 15/173* (2006.01)

(52) U.S. Cl.
USPC ........... 709/238; 709/235; 709/240; 709/241; 709/242; 709/244

(58) Field of Classification Search
CPC ................................ H04L 45/44; H04L 47/10
USPC ......... 709/238, 239, 240, 241, 242, 243, 244, 709/235
See application file for complete search history.

(56) References Cited

U.S. PATENT DOCUMENTS

| 5,267,235 | A | * | 11/1993 | Thacker ........................ 370/396 |
| 5,408,646 | A | | 4/1995 | Olnowich et al. |
| 5,533,198 | A | | 7/1996 | Thorson |
| 5,583,990 | A | | 12/1996 | Birritella et al. |
| 5,689,646 | A | | 11/1997 | Thorson |
| 5,737,628 | A | | 4/1998 | Birritella et al. |
| 5,797,035 | A | | 8/1998 | Birritella et al. |
| 6,343,066 | B2 | * | 1/2002 | Magill et al. .................. 370/230 |
| 6,735,212 | B1 | * | 5/2004 | Calamvokis ................... 370/412 |
| 6,807,594 | B1 | * | 10/2004 | Sindhu et al. ................. 710/240 |
| 6,950,877 | B2 | * | 9/2005 | Asano et al. ................... 709/238 |
| 6,959,151 | B1 | * | 10/2005 | Cotter et al. ..................... 398/54 |
| 7,110,360 | B1 | * | 9/2006 | Hui et al. ........................ 370/235 |
| 7,191,249 | B1 | * | 3/2007 | Lacroute et al. .............. 709/240 |
| 7,203,193 | B2 | * | 4/2007 | Hoof .............................. 370/389 |
| 7,327,695 | B2 | * | 2/2008 | Molnar et al. ................. 370/255 |

(Continued)

FOREIGN PATENT DOCUMENTS

| JP | 62248337 A | 10/1987 |
| KR | 1019920022717 A | 12/1992 |

OTHER PUBLICATIONS

Debasis Mitra, "Randomized Parallel Communications on an Extension of the Omega Network", Journal of the Association for Computing Machinery, vol. 34, No. 4, Oct. 1987, pp. 802-824.

(Continued)

*Primary Examiner* — Jimmy H Tran
(74) *Attorney, Agent, or Firm* — Schmeiser, Olsen & Watts LLP; Michael A. Rodriguez

(57) ABSTRACT

A parallel multiprocessor system includes a packet-switching communication network comprising a plurality of processor nodes operating concurrently in parallel. Each processor node generates messages to be sent simultaneously to a plurality of other processor nodes in the communication network. Each message is divided into a plurality of packets having a common destination processor node. Each processor node has an arbiter that determines an order in which to forward the packets onto the network toward their destination processor nodes and a network interface that sends the packets onto the network in accordance with the determined order. The determined order operates to substantially avoid sending consecutive packets from a given source processor node to a given destination processor node and to randomize the destination processor nodes of those packets presently traversing the communication network.

31 Claims, 10 Drawing Sheets

(56) References Cited

U.S. PATENT DOCUMENTS

| | | | |
|---|---|---|---|
| 7,688,815 B2 * | 3/2010 | Bialkowski et al. | 370/388 |
| 7,724,666 B1 * | 5/2010 | Hui et al. | 370/235 |
| 7,808,995 B2 * | 10/2010 | Kuo et al. | 370/392 |
| 7,839,786 B2 * | 11/2010 | Archer et al. | 370/235 |
| 2003/0081548 A1 * | 5/2003 | Langevin et al. | 370/230 |
| 2003/0110230 A1 | 6/2003 | Holdsworth et al. | |
| 2005/0135274 A1 * | 6/2005 | Molnar et al. | 370/255 |
| 2008/0084864 A1 * | 4/2008 | Archer et al. | 370/351 |
| 2009/0238209 A1 * | 9/2009 | Ju | 370/473 |
| 2011/0173399 A1 * | 7/2011 | Chen et al. | 711/154 |

OTHER PUBLICATIONS

L.G. Valiant, "Universal Schemes for Parallel Communication", ACM, 1981, pp. 263-277.

International Search Report and Written Opinion in counterpart international patent application No. PCT/US2011/023094 dated Nov. 25, 2011; 11 pages.

\* cited by examiner

MULTIPROCESSOR COMMUNICATION NETWORKS

GOVERNMENT RIGHTS IN THE INVENTION

This invention was made with United States government support under Air Force contract FA8721-05-C-0002 awarded by the Department of the Air Force. The government may have certain rights in the invention.

FIELD OF THE INVENTION

The invention relates generally to parallel multiprocessor systems. More specifically, the invention relates to data communications in a parallel multiprocessor system.

BACKGROUND

Typical parallel multiprocessor systems include a plurality of processor nodes interconnected by a communication network over which the processor nodes exchange information. In general, the processor nodes cooperate to perform computationally intensive applications, such as signal processing. Recently, the computational throughput of processor nodes has increased significantly because of increased processor speeds and the use of multiple processing cores within a processor node. For some applications, however, the communication bandwidth cannot keep up with processing throughput of the processor nodes.

Although some applications can run effectively with limited communication bandwidth, other applications experience greatly reduced processor efficiency. For example, applications running large graph algorithms on parallel processors often suffer significant performance reduction because of limited communication bandwidths. Another example of communication-intensive processing is a corner turn operation, which is often conducted as part of a signal-processing application. For these signal-processing applications, after a certain point, adding more processor nodes to the parallel multiprocessor system may not improve the total computational throughput, again, because of limitations in data communication.

Some commercial parallel multiprocessors utilize multiple vector processing units, multiple cores, or both to achieve very high computational throughput on a processor node, but support relatively little communication bandwidth. For example, cell processor nodes, each performing 410 GFLOPS at peak operation, may be connected by only two 10 Gbps communication ports on each of the nodes. This amounts to approximately 0.05 bits per second of communication for every 32-bit operation at the peak processing rate. Because some applications can require communication rates that are significantly higher than 0.05 bits per second, new types of communication networks are needed to support communication-intensive applications running on parallel multiprocessors.

Many types of communication networks have been proposed to support communications between multiple processor nodes. These types of networks include 1-D ring, 2-D grid, 3-D grid, 2-D toroidal grid, 3-D toroidal grid, hypercube, tree, fat tree, FFT (Fast Fourier Transform) butterfly, and omega networks. However, making efficient use of the network, regardless of type, still poses a challenge.

For many applications, each processor node needs to send messages to a number of other processor nodes. A conventional communication optimization algorithm collects all the messages that a source processor node needs to send to a particular destination processor node, and sends the collection as a single communication message, thus attempting to minimize the associated communication overhead. To convey this message from source to destination, however, the communication network often needs to dedicate the communication paths involved in the message communication, potentially preventing other messages from traversing these same occupied paths.

To use the network resources efficiently in this type of messaging system, the communications between multiple pairs of source and destination processor nodes require careful planning and management in order to maximize the simultaneous use of all communication paths within the network. Implementing such planning and management, however, can be difficult because optimizing network utilization requires simultaneous consideration of every communication path between all possible source and destination pairs and message length. Therefore, in practice, the achievable network utilization is often low.

Because packet-switching communication networks do not typically require careful global message planning and management, parallel multiprocessor systems are adopting their use. In a packet-switching communication network, switching nodes make all routing decisions locally. In addition, long messages can be divided and transmitted as multiple short messages and reconstructed at the receiving end. However, if one source processor node needs to send many short messages to a destination processor node, these messages can monopolize certain communication paths between these two processor nodes, and prevent other messages from traversing these same paths. When other pairs of sources and destinations add their communications to the network, the congestion can worsen and result in poor overall throughput.

SUMMARY

In one aspect, the invention features a packet-switching communication network comprising a plurality of processor nodes operating concurrently in parallel. Each processor node generates messages to be sent simultaneously to a plurality of other processor nodes in the communication network. Each message is divided into a plurality of packets having a common destination processor node. Each processor node has an arbiter that determines an order in which to forward the packets onto the network toward their destination processor nodes and a network interface that sends the packets onto the network in accordance with the determined order. The determined order operates to substantially avoid sending consecutive packets from a given source processor node to a given destination processor node and to randomize the destination processor nodes of those packets presently traversing the communication network.

In another aspect, the invention features a processor node in a parallel multiprocessor system. The processor node includes a processor that generates messages to be sent simultaneously to a plurality of destination processor nodes over communication links in a packet-switching communication network. The processor divides each message into a plurality of packets having a common destination processor node. An arbiter determines an order in which to forward the packets onto the packet-switching communication network toward their destination processor nodes. A network interface sends the packets onto the network in accordance with the determined order. The determined order operates to substantially avoid sending consecutive packets from the processor node to a given destination processor node and to randomize the destination processor nodes of those packets presently traversing the communication network.

In still another aspect, the invention features a method, in a parallel multiprocessor system, for exchanging messages among processor nodes interconnected by a packet-switching communication network. The method comprises identifying data to be sent simultaneously to a plurality of destination processor nodes. A message is generated for each destination processor node of the plurality of destination processor nodes for carrying the data to that destination processor node. Each message is divided into a plurality of packets having a common destination processor node. An order in which to forward the packets onto the communication network toward their destination processor nodes is determined. The order substantially avoids sending consecutive packets from a given source processor node to a given destination processor node and randomizes the destination processor nodes of those packets presently traversing the communication network.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1A:
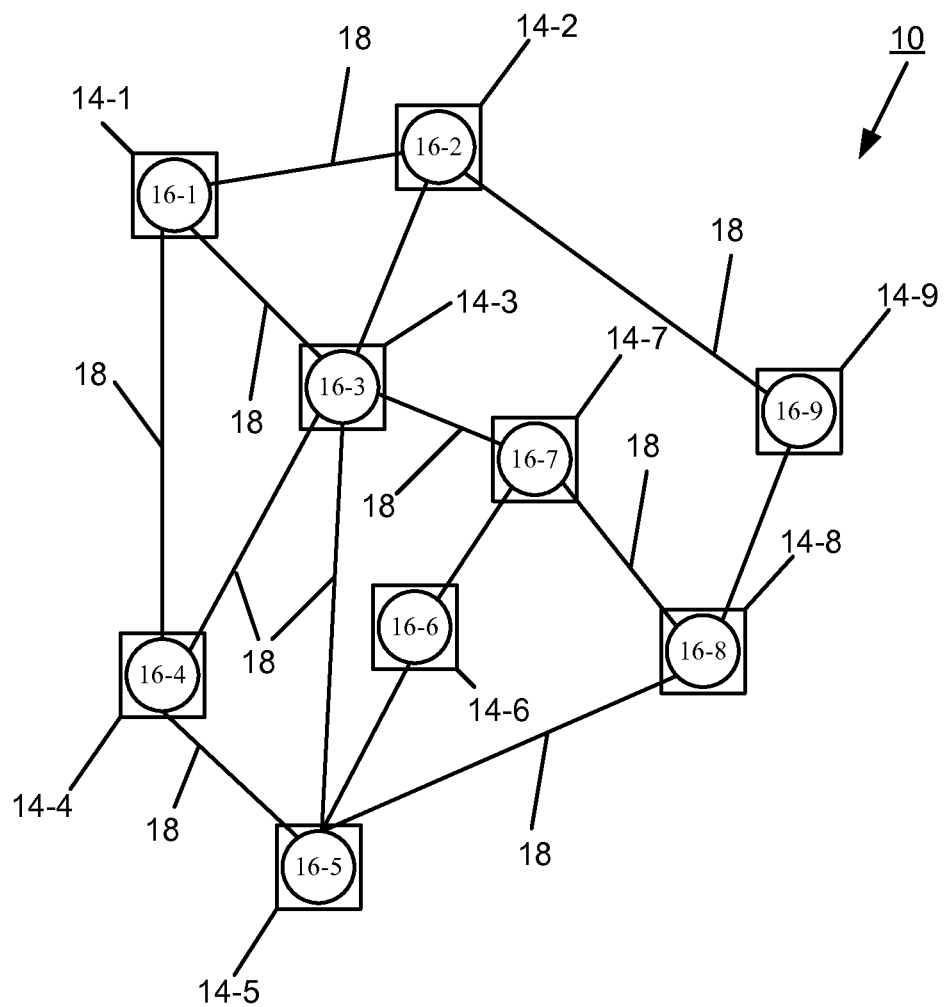
FIG. 1A, FIG. 1B, FIG. 1C, FIG. 1D, FIG. 1E, and FIG. 1F are diagrams of embodiments of packet-switching communication networks in which the principles of the invention may be practiced.

Parallel multiprocessor systems described herein include a plurality of processor nodes interconnected by a packet-switching communication network over which the processor nodes exchange messages divided over multiple packets. These processor nodes run communication-intensive applications in parallel and, in the process, often generate messages to be sent simultaneously to multiple other processor nodes on the network.

In brief overview, a source processor node divides each of its messages into a series of small packets having a common destination processor node. The source processor node sends these packets to their destination processor nodes in an order designed to avoid sending consecutive or near-consecutive packets from that source processor node to the same destination processor node, or to the same small set of neighboring destination processor nodes. Examples of near-consecutive packets are those packets going from the same source to the same destination separated by only one or two other packets going to a different destination. In general, this order interlaces packets of different messages over time, effectively distributing packet transmission from a given source processor node evenly among the destinations of these messages.

To establish this order, the source processor node follows a given pattern. In general, this given pattern is any pattern that has a randomizing effect on the routing of packets through the communication network. Examples of such patterns include, but are not limited to, random patterns, pseudo-random patterns, and sequential patterns (e.g., using a round-robin algorithm to select packets from messages).

In addition, the order can be established statically (predetermined) or dynamically (in real time, or at the time of selecting packets for transmission), which can depend upon the particular pattern followed by the source processor node. For example, an order based on a round-robin pattern is generally predetermined, whereas an order that follows a random pattern can be dynamically generated or predetermined, as with a pseudo-random pattern. In some embodiments, the determination of an order can have dynamic and static aspects. For example, an order for selecting a first packet from each of a set of messages can be based on a random pattern (dynamically generated at the time of packet selection), and that same random order is subsequently used to select a second packet, third packet, fourth packet, and so on, from each message; the static aspect being that the same random order is predetermined to repeat for subsequent sets of packets.

Preferably, each processor node in the communication network employs a different pattern for arriving at its order. With every source processor node functioning differently to distribute packet transmission evenly among the destinations of their messages, their cumulative operation effectively randomizes the destinations of those packets traversing the network at any point in time. Such randomization of the destinations also effectively distributes packet transmission evenly among the various communication links within the packet-switching communication network. The randomization of destinations can thus increase utilization of the communication network's bandwidth and decrease the likelihood of unwanted congestion on any given communication link, without requiring complex network management schemes to route packets through the packet-switching communication network, and without requiring extra communication links or extended communication paths to route packets.

FIG. 1A, FIG. 1B, FIG. 1C, FIG. 1D, FIG. 1E, and FIG. 1F show various examples of multiprocessor packet-switching communication networks that can practice the principles of the invention. The various multiprocessor packet-switching communication networks described herein can be implemented as integrated circuits connected at a bus level or as individual computer systems interconnected by a communication system (e.g., Gigabit Ethernet). Other types of network architectures can also practice the principles of the invention, examples of which include, but are not limited to, hypercube, FFT butterfly, omega, and fat tree networks. Each of the packet-switching communication networks illustrated in FIG. 1A through FIG. 1F can have hundreds and thousands of processor nodes operating in parallel, rather than the few processor nodes shown.

FIG. 1A shows an embodiment of a continuous random network 10 including a plurality of processor nodes 14-1 through 14-9 (generally, 14) interconnected by communication links 18. Each of the processor nodes includes a router 16, and functions as both a processing node and a packet-switching node.

Figure 1B:
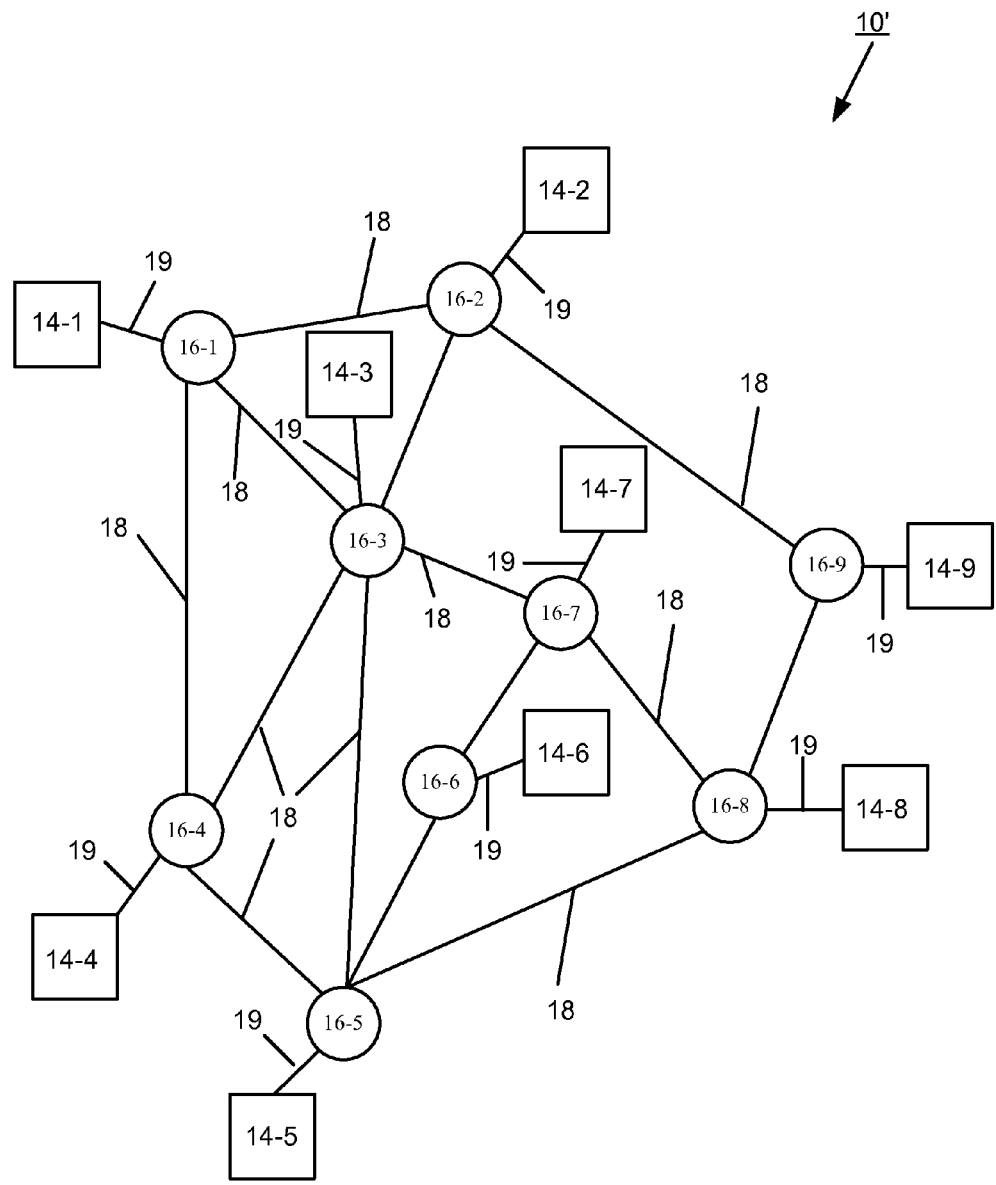

In other embodiments of packet-switching communication networks, the processor nodes 14 function exclusively as processing nodes, and other nodes in the network function exclusively as packet-switching nodes. For example, FIG. 1B shows a continuous random network 10' similar to that of FIG. 1A, except that processor nodes 14 are separate from the packet-switching nodes 16. The packet-switching nodes 16 are interconnected by communication links 18, and each processor node 14 is in communication with one of the packet-switching nodes 16 by a communication link 19.

In still other embodiments of packet-switching communication networks, the processor nodes 14 function exclusively as packet-switching nodes, and other nodes in the network function exclusively as processing nodes. For the purposes of simplifying the present description and FIGS., unless explicitly described otherwise, the processor nodes described hereafter function as both processing nodes and packet-switching nodes.

Figure 1C:
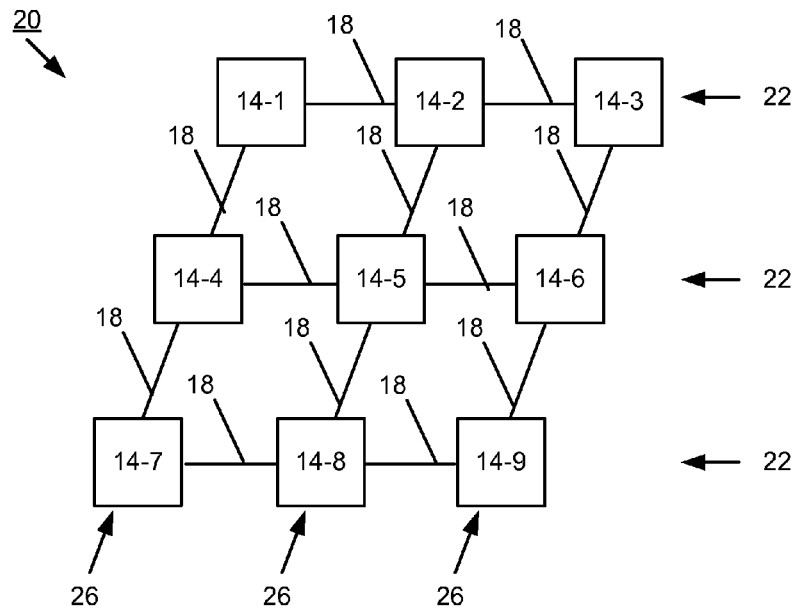
Figure 1D:
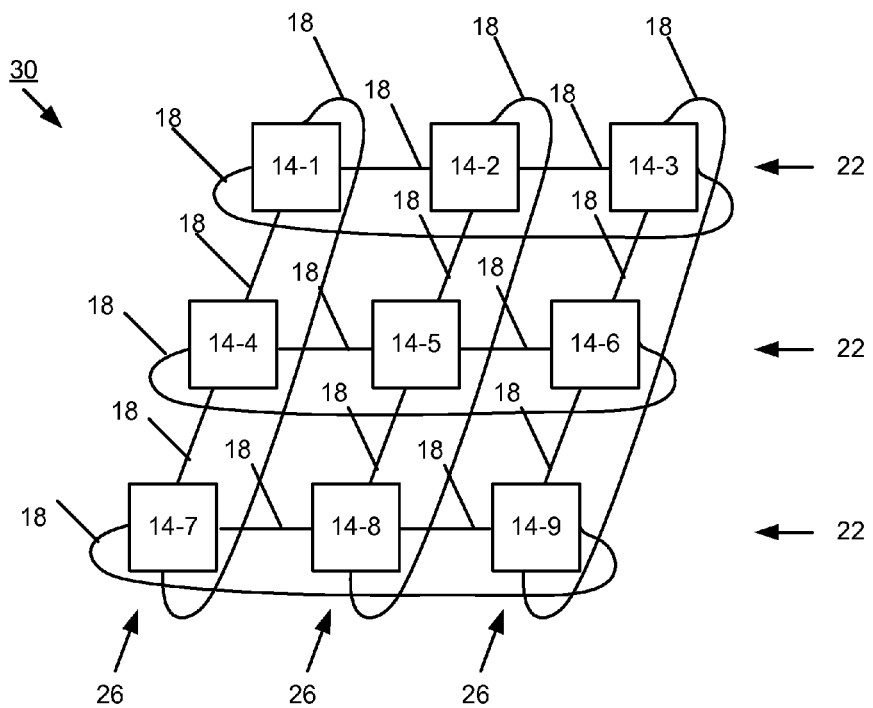

FIG. 1C shows an embodiment of a two-dimensional (2-D) grid network 20 with three rows 22 and three columns 26 of processor nodes 14. Each processor node 14 shares a communication link 18 with one or two adjacent processor nodes in the same column and with one or two adjacent processing nodes in the same row as that processor node. FIG. 1D shows an embodiment of a 2-D toroidal grid network 30, similar to the 2-D grid network of FIG. 1C, with the addition of communication links 18 between processor nodes at the opposite ends of each column and at the opposite ends of each row.

Figure 1F:
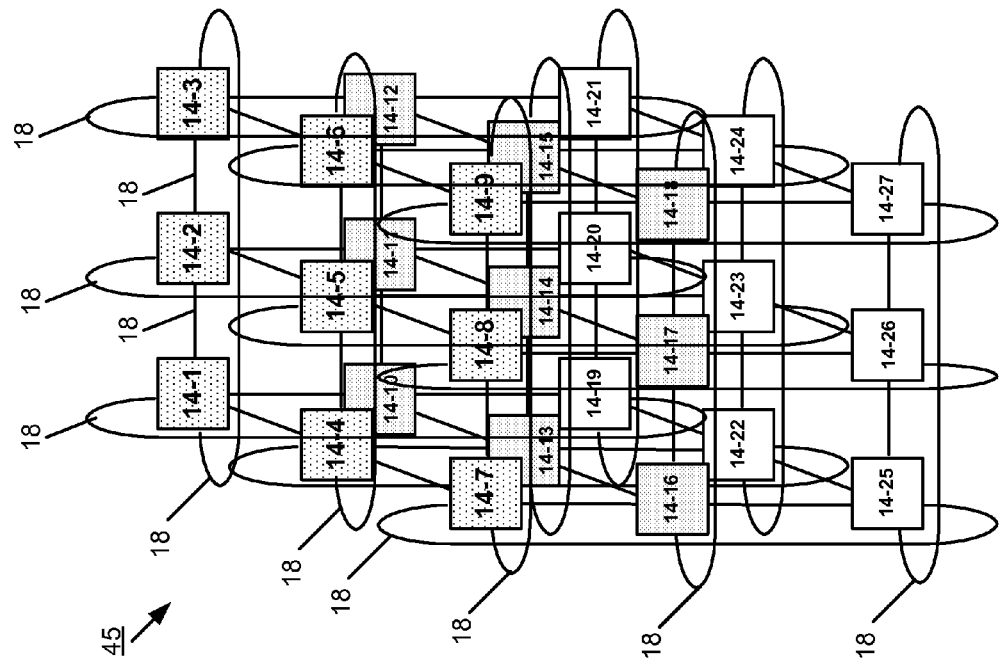
Figure 1E:
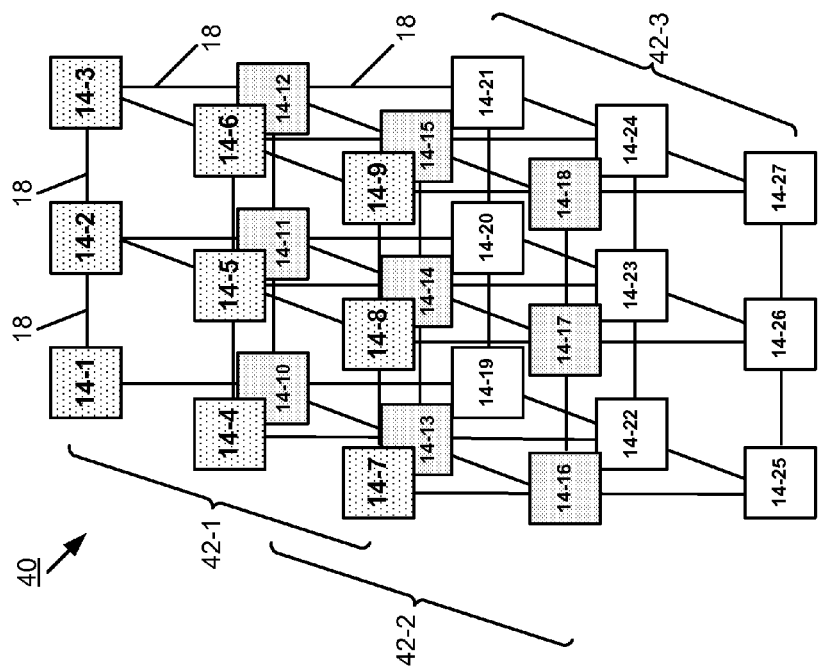

FIG. 1E shows an embodiment of a three-dimensional (3-D) grid network 40 having three planes 42-1, 42-2, 42-3, each comprised of processor nodes arranged like the 2-D grid network of FIG. 1C. FIG. 1F shows an embodiment of a 3-D toroidal grid network 45 similar to the 3-D grid network of FIG. 1E, with the addition of communication links 18 between processor nodes at the opposite ends of each horizontal column, at the opposite ends of each vertical column, and at the opposite ends of each row.

The processor nodes 14 communicate with each other over the communication links 18 by way of packets, and the size of the packets depends upon the particular implementation of the communication network. Messages passed between processor nodes can be large and span multiple packets. A source processor node breaks a message into multiple packets. Packets can have a uniform or non-uniform size. Each packet belonging to a given message traverses the communication network as an independent data unit, and contains sufficient information so that a destination processor node can reconstruct the original message from the received packets, even if the packets arrive out of order. In addition to carrying data, each packet includes a header, typically comprised of a destination address of a destination processor node, packet information (such as a sequence number, for reconstructing the message), and other information, such as error detection and correction bits.

The particular packet size employed within a given packet-switching communication network involves certain trade-offs. Generally, small packet sizes are preferred over large packet sizes in order to reduce the potential of network congestion and to foster balanced utilization of the communication links among the processor nodes, whereas large packet sizes are preferred over small packets in order to reduce the amount of communication overhead associated with each transmitted data element.

Routing distances generally vary among different pairs of source and destination processor nodes in a communication network. If, when routing a packet, a processor node encounters a busy communication link, the processor node can wait for the communication link to become available or reroute the packet over another communication link, depending on the details of the routing algorithm followed by the processor node. In one embodiment, the routing algorithm restricts routes to shortest paths only, in which case rerouting is not permitted, unless necessary (e.g., because of a broken communication link).

If a given processor node sends many consecutive packets, or packets sent closely in time, to the same destination processor node or to a few neighboring destination processor nodes, then some communication links can become overused and interfere with other packet communications. The exact nature of the congestion and inefficiency depends on the communication network type and implementation details. In order to increase network utilization efficiency, and decrease congestion, each processor node in the communication network establishes an order in which that processor node forwards packets towards their destinations; this order is designed to avoid sending consecutive packets, or packets sent closely in time, to the same destination processor node, and thereby to effectively randomize the routing of packets through the network.

Sending consecutive packets to different destination processor nodes operates to randomize the routing of packets through the communication network. The overall steady-state effect is to distribute packet traffic almost evenly across the communication links in the network, thus preventing any particular communication link from becoming busy or blocked for long periods. In addition, by using packets of small size, for example, between 64 and 256 bits, the duration of any congesting of a communication link is likely to be statistically brief in the event such congestion were to occur.

Figure 2:
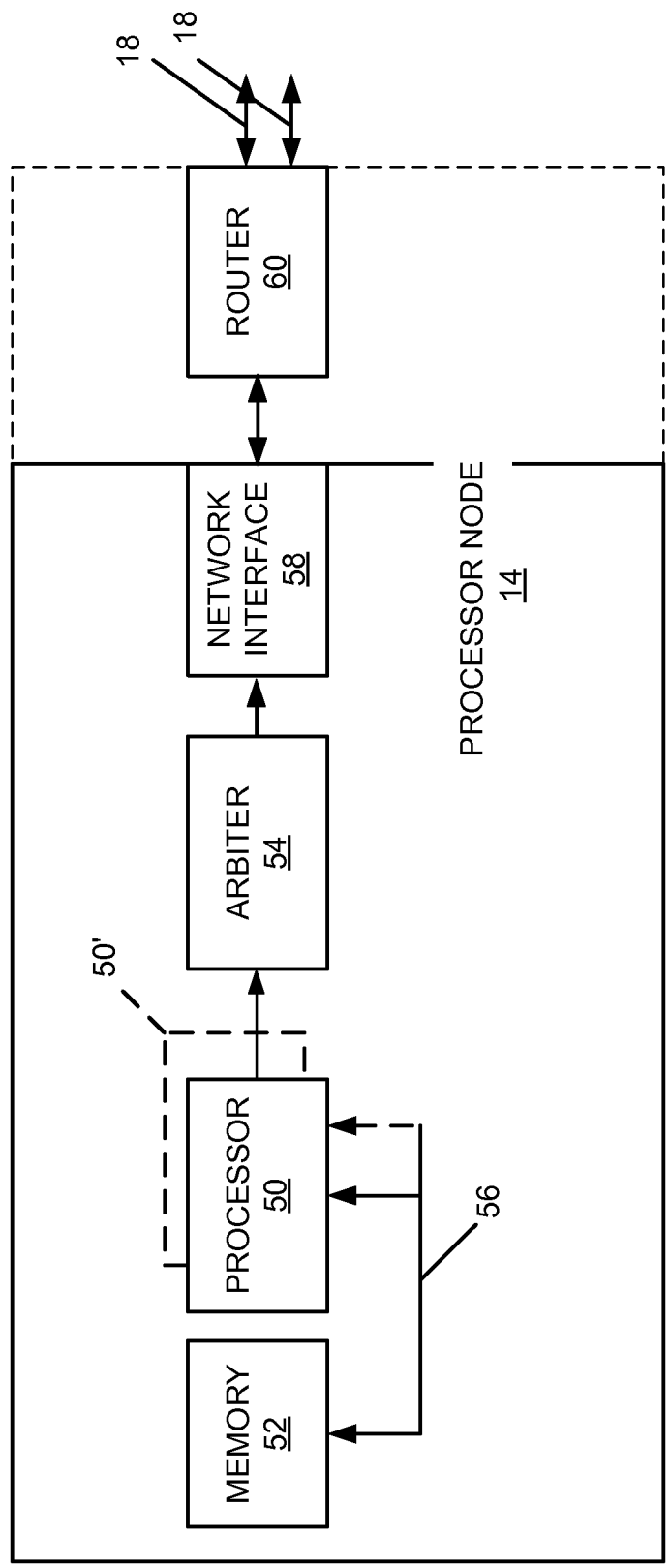
FIG. 2 is a block diagram of an embodiment of a processor node including a processor, memory, an arbiter, a network interface, and, optionally, a router.

FIG. 2 shows a simplified embodiment of a processor node 14 that can forward messages to destination processor nodes in accordance with the principles of the invention. The processor node 14 includes a processor 50 in communication with local memory 52 over a communication bus 56. The processor 50 can be any entity capable of providing processing functionality, examples of which include, but are not limited to, a microprocessor, a central processing unit, a microcontroller, special-purpose processor, custom processor, Field Programmable Gate Array (FPGA), finite state machine, and custom logic. The processor node can have more than one processor (i.e., processing core), as illustrated by the dashed block 50'. The communication bus 56 provides a high-bandwidth data path between the processor 50 and local memory 52.

The processor 50 is also in communication with a network interface 58 through an arbiter 54. Instead of being separate blocks, the functionality of the processor 50 and the arbiter 54 can be combined within a single block; that is, the processor 50 performs the functionality of the arbiter 54. Alternatively, the functionality of the arbiter 54 can be combined with the network interface 58; that is, the network interface 58 performs the functionality of the arbiter 54. The network interface 58 is in communication with a router 60, which forwards the packets over communication links 18 based on the packets' destination addresses. Packets addressed to the processor node 14 arrive at the network interface 58 from the router 60. In one embodiment, denoted by dashed lines, the processor node 14 is also a packet-switching node, and further includes the router 60. In addition, the processor 50 can perform the functionality of the arbiter, network interface, router, or any combination thereof.

Among other functions, the processor 50 performs arithmetic and logical operations in accordance with a particular parallel processing algorithm being executed by the parallel multiprocessor system. During execution of the parallel processing algorithm, the processor 50 generates messages for sending simultaneously to other processor nodes in the network, and breaks these messages into small packets. The local memory 52 stores data, for example, the data elements of matrices that the processor nodes arithmetically manipulate during execution of the parallel processing algorithm. Examples of storage media for implementing the local memory 52 include, but are not limited to, volatile storage media (e.g., dynamic random access memory (DRAM) and static RAM), with non-removable and removable non-volatile storage (e.g., FLASH, EEPROM, hard disks, USB memory sticks, optical disks such as CD ROMs, magnetic diskettes, and flash memory cards), or any combination thereof.

The arbiter 54 forwards the packets produced by the processor 50 to the network interface 58 in an order designed to contribute to randomized packet destinations, and consequently, to distributed use of the communication links 18 of the network, as described below. The network interface 58 formats packets for transmission over the communication network towards their destinations.

Figure 3:
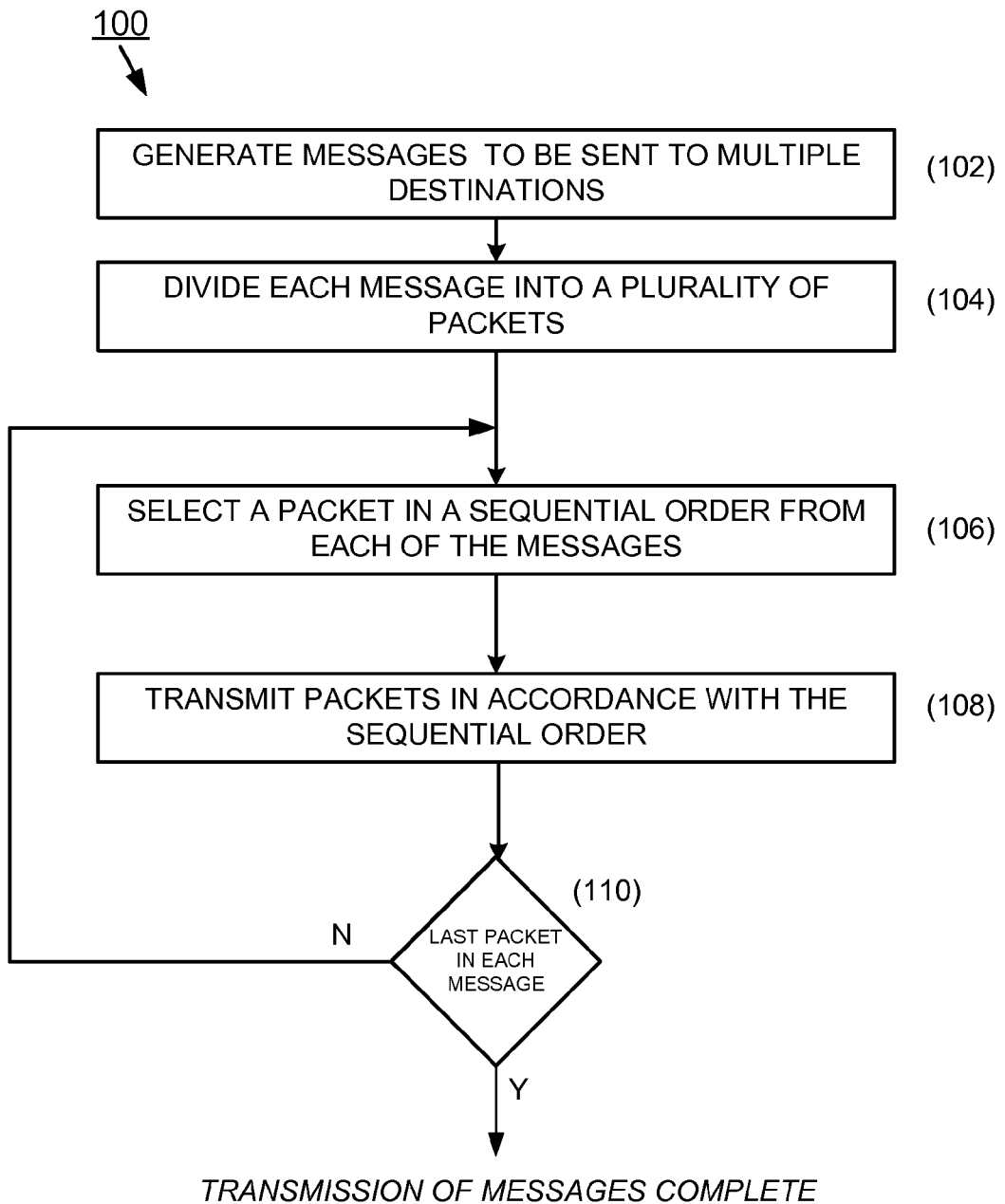
FIG. 3 is a diagram of an embodiment of a process for transmitting messages from a source processor node to a plurality of destination processor nodes.

FIG. 3 shows a flow diagram of an embodiment of a process 100 for use in a parallel multiprocessor system to distribute packet traffic evenly among the communication links between a source processor node and the multiple destinations of the messages transmitted by that source processor node. During execution of a parallel processing algorithm, each (source) processor node generates (step 102) messages to be sent simultaneously to a plurality of other (destination) processor nodes in the communication network. The messages can be the same or different for the different destination processor nodes.

Each source processor node divides (step 104) each of its messages into a plurality of small packets having a common (i.e., the same) destination processor node. For example, a given source processor node determines that a different message is to be sent to N−1 different destination processor nodes; that is, the source processor node is transmitting N−1 messages, with each message targeted to a different destination processor node. Further consider, for example, that each message is of the same size, being 4096 bits in length, and that the source processor node divides each message into 32 packets of 128 bits in size (in addition to data payload, a packet includes a header; thus, all packets of a message combined can require more bandwidth than the message). The result is 32*(N−1) packets addressed to N−1 different destination processor nodes.

When forwarding the packets towards their destination processor nodes, each source processor node selects (step 106) one packet from each message in an order designed to avoid sending consecutive or near-consecutive packets to the same destination processor node or to a small set of neighboring processor nodes. One mechanism for establishing this order is for the source processor node to select messages, from which to take a packet, at random. The source processor node then transmits (step 108) the selected packets in accordance with this order. Accordingly, consecutive packets leaving a source processor node pass to different destination processor nodes. Packet transmission can take place after packet selection is finished or while packet selection is in progress.

After selecting a first packet from each of the messages, the source processor node selects a second packet from each message in accordance with an order. The order for the second packets of each message also can be established at random, in which case, it is likely to be different from the order used to transmit the first packets of each message. Alternatively, the order used for the second packets of each message can be the same as the order for the first packets.

The process of selecting another packet from each message in accordance with an order repeats (step 110) and ends with the selection of the last packet of each message. The cumulative effect of the packet selections made by all of the source processor nodes in the network is to randomize the destinations of the packet traffic on the network at any point in time.

Some packets may have priority over other packets. In one embodiment, the packet selection process can be weighted to accommodate packets with priority (i.e., to send packets with priority earlier than those without priority). For example, a source processor node can randomize packets of high priority messages before randomizing packets of low priority messages. In addition, during the packet selection and transmission, a given processor node may receive packets addressed to other destination processor nodes, which the given processor node must then forward toward their destinations. The arbiter pools these received packets with the packets awaiting selection and integrates them into the order used to select packets (giving preferential treatment to high priority packets arriving or waiting to be routed).

In one embodiment, communication among the processor nodes is slot-based. For example, the communication links of a slot-based communication network can continuously convey a message of a fixed size. This fixed-size message has a plurality of packet slots (the message can continuously pass from processor node to processor node, irrespective of whether any of the packet slots contain data). In general, each processor node decides which packet to remove from the message and which packet to insert into the message. More specifically, in response to receiving the message, the processor node parses the occupied packet slots for packets addressed to that processor node, and extracts any such packets. In addition, the processor node inserts its outgoing packets into any empty packet slots (either empty when the message arrived, or made empty by the extraction of a packet after reaching its destination, i.e., the present processor node). A packet inserted into an empty slot can be equal in size or smaller than the size of the slot (i.e., the packet does not need to fill the entire slot).

Figure 4:
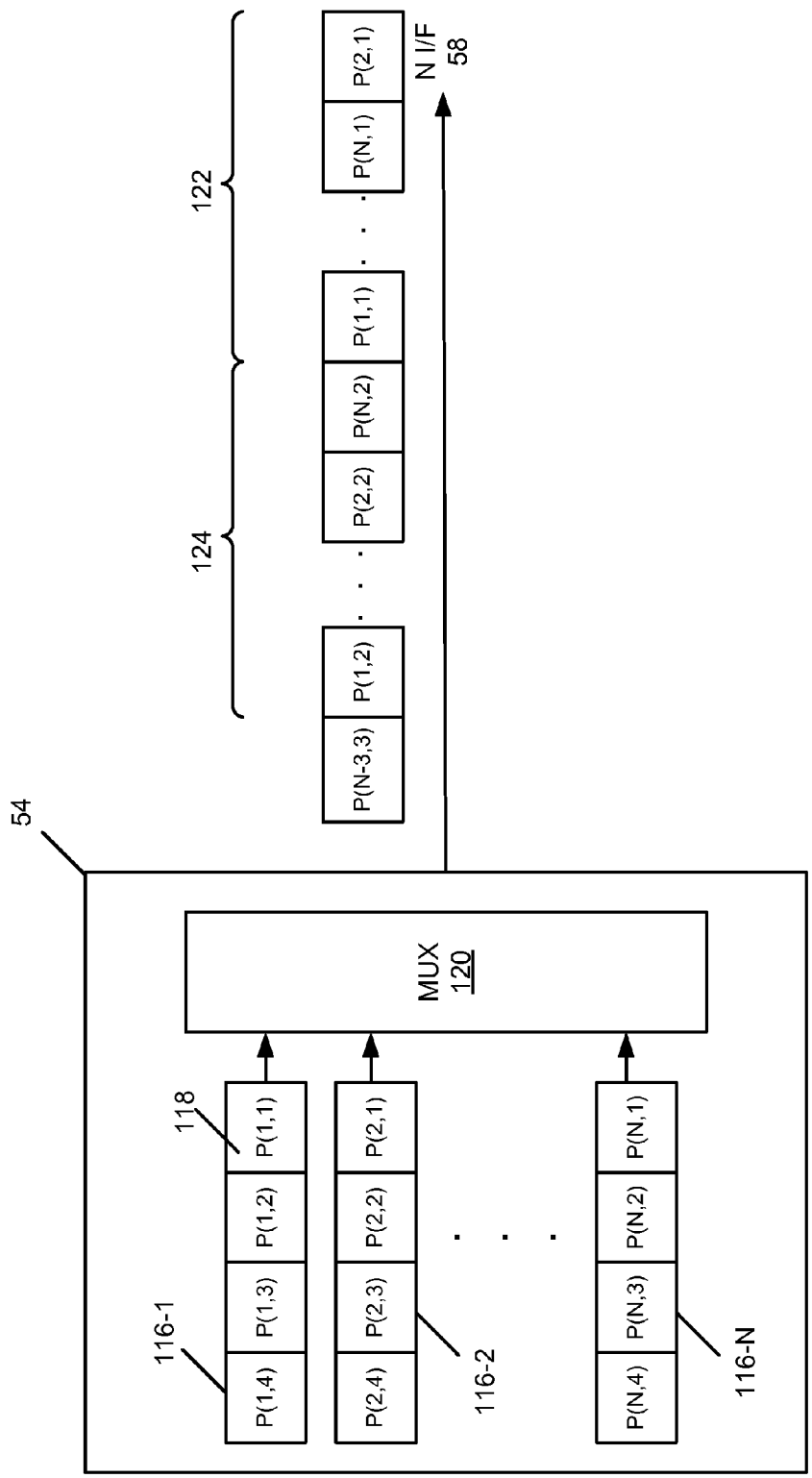
FIG. 4 is a diagram of an embodiment of an arbiter that determines an example of an order in which to send packets onto the network, the order having a randomizing effect on the routing of packets through the network.

To produce randomized packet traffic patterns in a communication network (e.g., slot-based, not slot-based), the processor nodes can employ any one of a variety of techniques. FIG. 4 shows an example of one such technique that divides multiple messages into small packets and sends the small packets to their destination processor nodes in an order that has a randomizing effect on the routing of packets through the network. In this example, the arbiter 54 of a source processor node 14 is sending one message 116-1, 116-2, . . . , 116-N (generally, 116) to each of the N destination processor nodes. The messages can be of varying length and are broken up into small packets 118. P(n, m) represents the m-th packet in a message that is being sent to the destination processor node n.

The arbiter 54 includes a multiplexer 120 that receives and processes the packets of each message in a first-to-last order. The first set of packets from which the multiplexer 120 selects packets comprises the first packet (i.e., P(n, 1)) of each message. For purposes of this example, consider that the multiplexer 120 dynamically generates the order for selecting packets using a random pattern. The multiplexer 120 randomizes the order of these first packets, and forwards these first packets to the network interface 58 in that randomized order. Alternatively, the multiplexer can establish the order in accordance with a predetermined pseudo-random pattern, or any other pattern that has a randomizing effect on the routing of packets through the network.

After processing the first packets 122 of the messages, the arbiter 54 randomizes the order of the second packets 124 of the messages and forwards these second packets to the network interface 58 according to that randomized order. In this example, the random order of the destinations of the first packets is different from that of the second packets. In another embodiment, the random order for the second packets is the same as the random order for the first packets. An example of an output packet stream that can be produced by the arbiter is P(2, 1), P(N,1), ... P(1,1), P(N,2), P(2,2), ... P(1,2), P(N−3,3), and so on, until the set of Nth packets are randomized and forwarded to the network interface 58.

One or more of the messages may be longer than the other messages being transmitted. Transmission of the last packet of those other shorter messages leaves fewer packets to select in random order (provided no new messages replace those just transmitted), and, thus, can increase the likelihood of sending consecutive or near-consecutive packets to the same destination processor node. One technique for handling variable-length messages, so as to avoid this increased likelihood of sending consecutive or near-consecutive packets to the same destination processor node, is to place all outgoing packets in a pool and randomly choose the next packet from all outgoing packets awaiting transmission (irrespective of the message or location in the message from which the packet is taken). The destination processor node can reconstruct the message although its packets are received out of sequence.

By randomizing the destinations of consecutive packets from each source processor node, packets traverse the communication links in the network in generally random directions. The randomly directed flows of packet traffic effectively distribute the packet traffic almost evenly across the communication links throughout the network, particularly when many of the parallel processor nodes are concurrently operating to generate and simultaneously send multiple messages to multiple destination processor nodes. As a result, the likelihood of congestion on any given communication link diminishes, because the communication links are not carrying traffic flows comprised of many consecutive packets passing between a given source processor node and a given destination processor node.

Conceivably, the randomizing of destinations could produce two consecutive packets that have a common destination processor node if the random order used for the second set of packets is different from the random order used for the first set of packets. For example, two such packets can occur at the boundary where the arbiter 54 completes processing the first packets of the messages and starts processing the second packets of the messages. Consecutive packets with the same destination arise if the last packet selected from the set of the first packets 122 has the same destination as the first packet selected from the set of second packets 124. Notwithstanding, because the number of destination processor nodes is often large (e.g., N=1000), the likelihood of two consecutive packets having the same destination processor node is statistically low (e.g., 1/1000*1/1000, or one in a million). Hence, each source processor node can be considered to substantially avoid sending consecutive packets to a given destination processor node, especially when the number of processor nodes in the parallel multiprocessor system renders the probability of such an occurrence negligible.

Another technique for randomizing packet destinations includes assembling all outgoing packets in a one-dimensional array and scrambling the order of the packets in the array. The arbiter 54 then steps through the array, from the first array element to the last, when selecting packets for transmission.

Sufficiently randomized use of the communication links in the communication network can also be achieved without random packet selection. For instance, the collective packet-forwarding behavior of the processor nodes in the network can produce a random effect, although the forwarding behavior of each individual processor node is not random.

Figure 5:
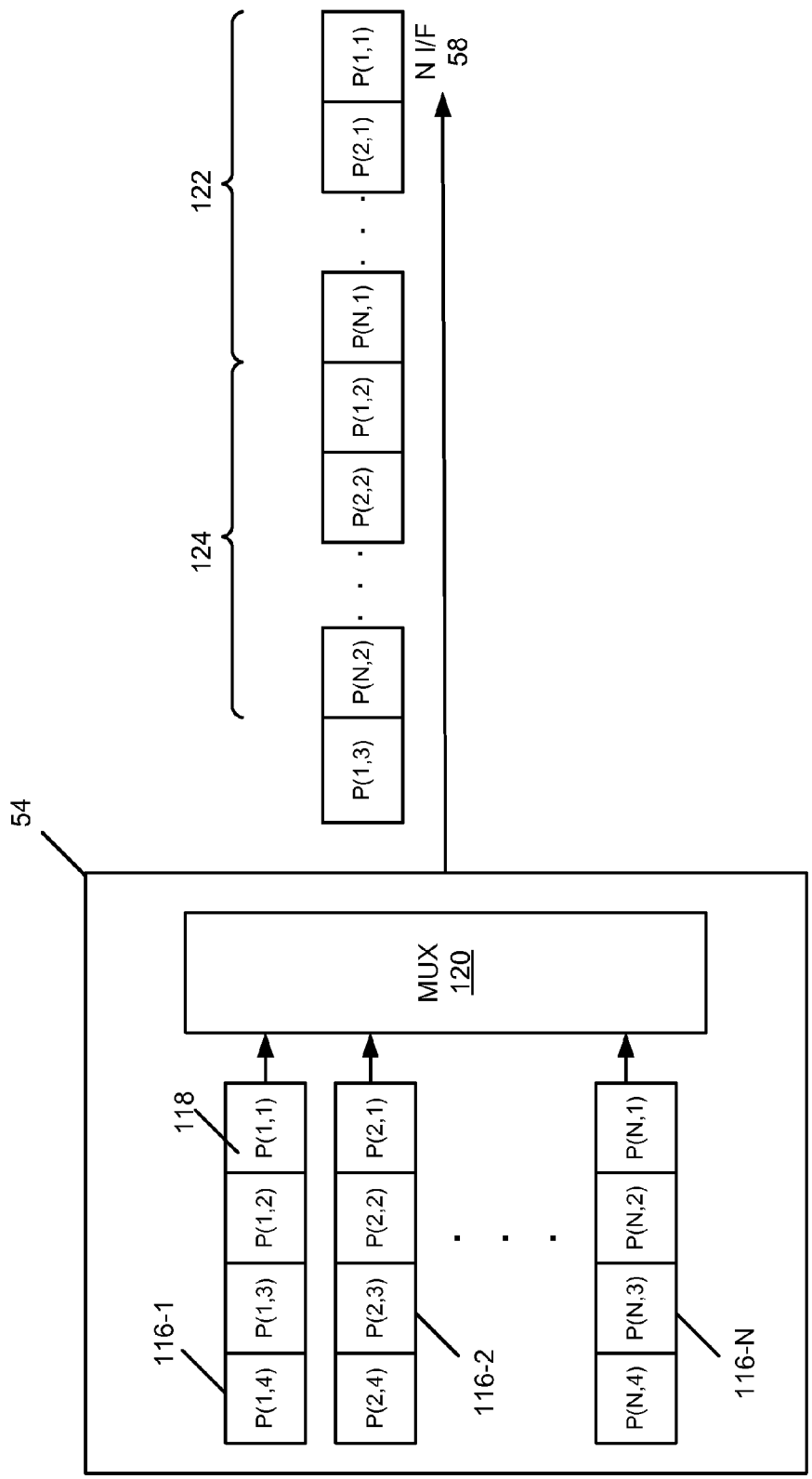
FIG. 5 is a diagram of the arbiter that determines another example of an order in which to send packets onto the network, the order having a randomizing effect on the routing of packets through the network.

For example, FIG. 5 shows the same messages and packets as those in FIG. 4. In this example, the multiplexer 120 is configured to select one packet from each message in a round-robin fashion. Accordingly, the arbiter 54 forwards packets in accordance with the general formula during eac round of the round-robin process: P(1,m), P(2,m), P(3,m), ..., P(N,m), where, again, P(n, m) represents the m-th packet in a message being sent to the destination processor node n (m also corresponds to the current round in the round-robin process). Thus, for each round of the round-robin process, the arbiter forwards one packet to each of the N destination processor nodes. The arbiter repeats this round-robin sequence with the second packet of each message, then the third packet of each message, and so on, until every packet of all N messages have been forwarded toward their destinations.

When the communication patterns of the processor nodes in the network are not identical (i.e., many source processor nodes are sending packets to different sets of destination processor nodes), the processor nodes can implement the same sequential destination order (e.g., the same round-robin sequence), with the cumulative effect on the network being random usage of the communication links. In such situations, the effect of breaking messages into small packets and sending consecutive packets to different destinations may be sufficient to prevent congestion.

If, instead, many source processor nodes are sending packets at the same time to identical or near-identical sets of destination processor nodes using the same sequential destination address order, the starting point for executing the order should be staggered across the source processor nodes. For example, a first source processor node starts the sequential selection with a packet of the first message, a second source processor node starts with a packet of the second message, a third source processor node starts the order with a packet of the third message, and so on. This staggering is similar to offsetting the packet selection process of the processor nodes with different time delays.

The process of randomizing the routing of packets throughout the network is particularly advantageous when a source processor node needs to send multiple messages to multiple destinations at the same time, a situation that arises during the execution of many different types of parallel processing algorithms. This process can be reserved specifically for communication-intensive portions of the parallel processing algorithm, whereas any other portions of the computation that require significantly less communication bandwidths among the processor nodes may be implemented without randomization.

For some parallel processing algorithms, a source processor node may need to communicate with only one or two destination processor nodes. For such parallel processing algorithms, the source processor node can run multiple instances of the algorithm simultaneously, with each instance needing to communicate with one or two different destination processor nodes, so that the source processor node is concurrently communicating with many multiple destination processor nodes, instead of just one or two. The increase in destination processor nodes improves the randomization of destinations of those packets traversing the network.

Figure 6:
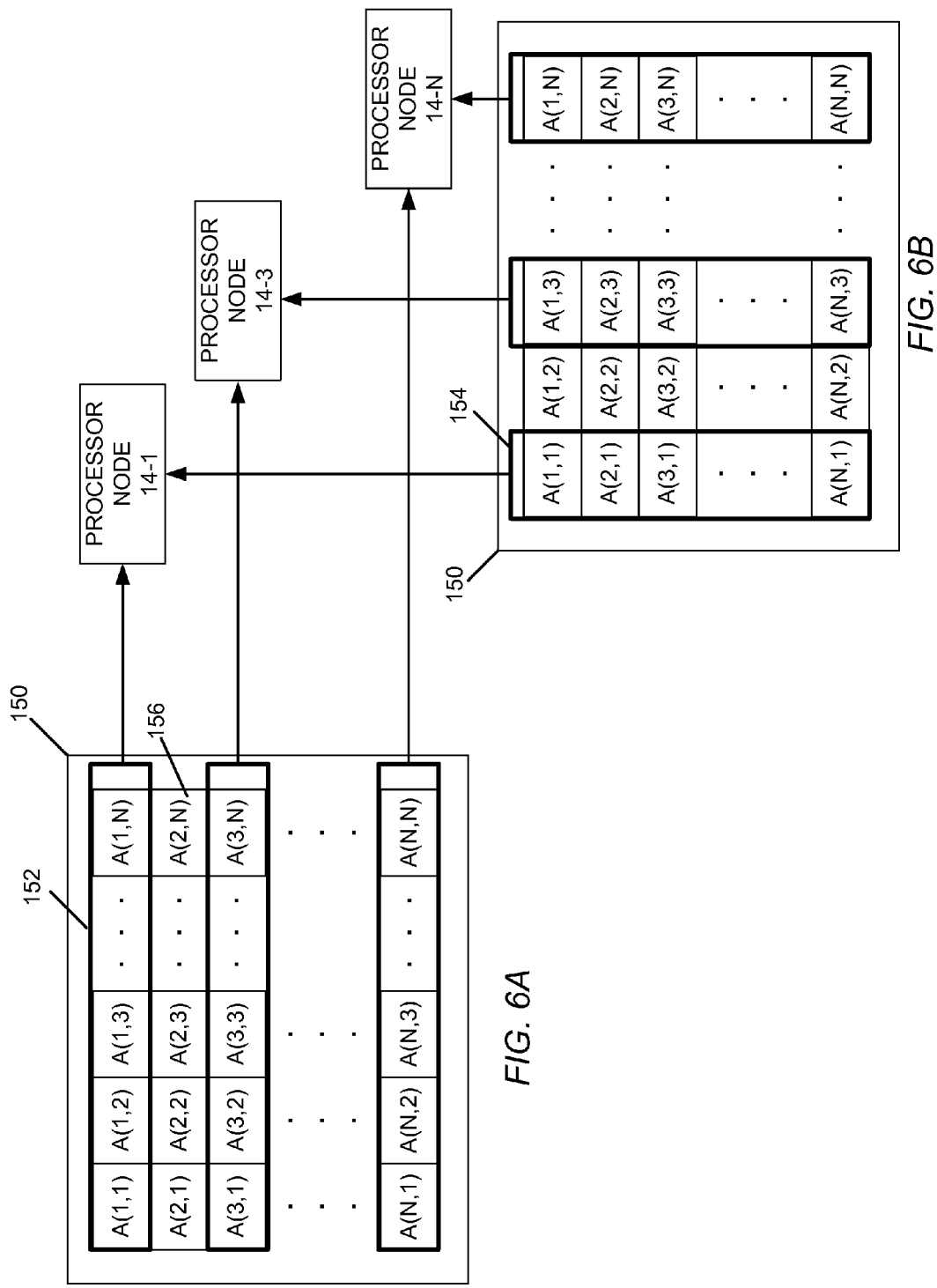
FIG. 6A and FIG. 6B are diagrams illustrating, by example, the storage of the data elements of a matrix before and after a plurality of processor nodes cooperatively perform a corner turn operation.

One example of a parallel processing algorithm that involves multiple processor nodes communicating simultaneously with multiple other processor nodes is the corner turn operation (i.e., a matrix transpose operation) commonly used in many signal-processing applications. FIG. 6A and FIG. 6B illustrate a simple corner turn operation involving, for example, N processor nodes and a matrix 150 having N rows 152 and N columns 154 of data elements 156. FIG. 6A shows which processor nodes store the data elements of the matrix 150 before the corner turn operation, and FIG. 6B shows where the data elements of the matrix 150 are stored after completion of the corner turn operation.

Initially, before the corner turn, each of the N processor nodes stores the data elements of one row 152 of the matrix 150. For example, the processor node 14-1 stores data elements A(1,1), A(1,2), ..., A(1,N), and processor 14-N stores data elements A(N,1), A(N,2), ..., A(N,N), where A(i,j) represents the data element of the i-th row and the j-th column of the matrix 150. After the corner turn operation, each of the N processor nodes stores the data elements of one column 154 of the matrix 150. For example, the processor node 14-1 subsequently stores data elements A(1,1), A(2,1), ..., A(N,1), and processor 14-N stores data elements A(1,N), A(2,N), ..., A(N,N), As part of a corner turn operation, column-based data processing can follow row-based processing. As part of the column-based data processing, each processor node 14-i sends the data element A(i,j) to the processor node 14-j. For example, the processor node 14-1 sends the data element A(1,2) to the processor node 14-2, data element A(1,3) to the processor node 14-3, and data element A(1,N) to the processor node 14-N. Accordingly, each processor node sends N−1 data elements to N−1 other processor nodes. Moreover, the processor nodes are transmitting these data elements over the network simultaneously.

To achieve efficient (and distributed) usage of the communication links 18, each packet includes one data element of the matrix 150 and is targeted to one destination processor node. Although packet communication is already somewhat randomized because the number of rows and columns are equal to the number of processor nodes, optionally each processor node can transmit its packets to the N−1 destination processor nodes in an order that produces a randomizing effect on the routing of packets throughout the network, as described above.

Building upon this example, consider that the size of the matrix 150 is larger than N×N, where N is the number of processor nodes; that is, the number of rows and columns is much larger than the number of processor nodes. In this instance, parallel processing is often used to handle the high computational throughput and memory demands of a large matrix. Each processor node can initially store multiple rows of data elements before the corner turn operation, and then store multiple columns of data elements after the corner turn operation. In the exchange of data elements, each packet can contain multiple data elements going to the same destination processor node. Although carrying multiple data elements, each packet can still be relatively small in size (e.g., 4×4 blocks of 32-bit data elements, a 32-bit row address, and a 32-bit column address, in addition to the packet header containing the destination processor node address and error correction bits). In addition, each processor node can transmit its packets to the N−1 destination processor nodes in an order designed to avoid sending consecutive or near-consecutive packets to the same destination processor node, with the net effect of randomizing packet routing throughout the network.

Figure 7:
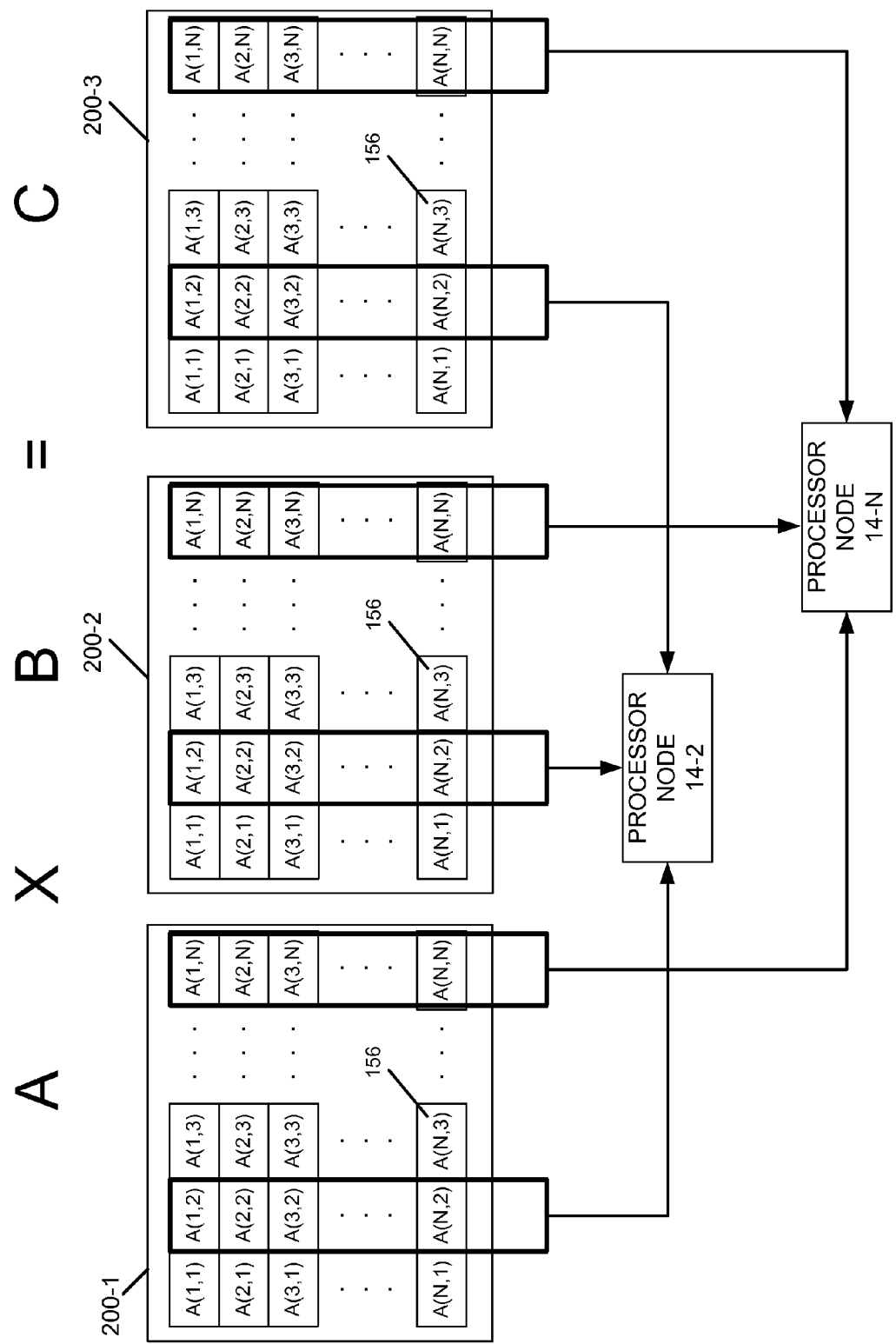
FIG. 7 is a diagram illustrating, by example, the storage of data elements of matrices during a matrix-multiplication operation performed by a plurality of processor nodes.

Another example of a parallel processing algorithm involving multiple processor nodes that communicate simultaneously with multiple other processor nodes involves matrix multiplication. FIG. 7 shows three matrices 200-1, 200-2, and 200-3 (referred to, respectively, in shorthand notation, as matrix A, matrix B, and matrix C). Each matrix is N×N in size and is stored across N processor nodes. For example, the processor node 14-2 stores the second column of each matrix (data elements A(i,2), B(i,2), and C(i,2)), and the processor node 14-N stores the Nth column of each matrix (data elements A(i,N), B(i,N), and C(i,N)).

In this example, the processor nodes 14 are operating in parallel to multiply matrix A by matrix B. The product is being stored in matrix C (i.e., C=A×B). For this example, each processor node performs the multiplication and addition operations that compute the matrix C data elements stored by that processor node. For example, the processor node 14-N performs the multiplication and addition operations that compute data elements C(1,N), C(2,N), C(3,N), ..., C(N,N), which are stored by the processor node 14-N.

With this particular distribution of data elements, in order to compute matrix C as a multiplication of matrix A with matrix B, each processor node needs access to all data elements of matrix A in order to compute one column of matrix C using one column of matrix B. Thus, each processor node computes $C(i,j)=\Sigma(A(i,k)*B(k,j))$ for the column of matrix C stored by that processor node. Accordingly, each processor node needs to send the column of matrix A stored by that processor node to all other processors node. To send its column (of N data elements), each processor node prepares packets for transmission to each of the destination processor nodes (the size of such packets being configured for the particular communication network, to contain one, two, or more, but far fewer than N data elements), establishes an order for the packets (to avoid consecutive and/or near-consecutive packets to the same destination), and transmits the packets in accordance with this order.

Still other examples of parallel processing algorithms that involve multiple processor nodes communicating simultaneously with other multiple processor nodes are graph algorithms. In a graph, each vertex is usually connected to multiple other vertices by edges. Traversing these graph edges often requires multi-destination communications. However, visualizing a traversing of edges with parallel processor implementations of graph algorithms can be difficult. Accordingly, graph algorithms may be recast into sparse matrix algorithms with vertices representing the sparse matrix row and column indices and edges representing non-zero sparse matrix elements.

When a graph algorithm is recast into a sparse matrix implementation, the dominant operations often comprise multiplication and addition operations of matrices and vectors. Depending on the graph algorithm, the individual multiplication and addition operators in the matrix and vector operations may need to be replaced with other arithmetic or logical operators, including minimum, maximum, AND, XOR, and other operators. Therefore, multi-destination communication patterns are common in these matrix and vector operations and can be implemented using randomized destination communications in ways similar to the aforementioned matrix examples. Even if a graph algorithm is not implemented using sparse matrix arithmetic, the data flow is often similar or identical to sparse matrix-based implementations, and randomized destination communication may still be used effectively.

Simulation Results

To evaluate the effect of randomizing packet destinations on network utilization, simulations were run for an 8×8×8 3-D toroidal grid network that used slot-based communications. The simulations compared a first application, in which a large number of packets from each processor node passed to all other processor nodes in a random order, with a second application, in which a large number of packets passed from each source processor node to a single destination processor node and each destination processor node received packets from a unique source processor node.

Although the network utilization performance may vary, depending on the particular routing algorithm used and the particular simulated data set, the first application (random order) achieved 5.7 times greater network bandwidth compared to the second application (non-random order). The first application also achieved 87% utilization of the maximum network bandwidth compared to 15% utilization for the second configuration. (The network utilization bandwidth was measured in total number of packets delivered per unit time compared to the maximum theoretical throughput of the network; the maximum theoretical network bandwidth, which is equal to 100%, being defined as the total network bandwidth achievable for the given packets if all the communication links in the network were utilized fully with no contention.)

Another simulation involved all source processor nodes sending packets to all destination processor nodes using identical sequentially ordered addresses of the destination processor nodes. The utilization of the theoretical maximum network bandwidth approximated 64%. The small packet sizes may have prevented utilization from being less than 64% because sequential addressing becomes similar to random addressing over time. This result may come from initial congestions producing different packet latencies at different source processor nodes, which removes any initial synchronization caused by using identical sequentially ordered destination addressing.

In another simulation, with the source processor nodes using identical destination address sequences, but with each source processor node having a different starting point within the destination address sequence, the overall network throughput was on par with or an improvement over the random destination addressing simulation. These simulations demonstrate that small packet sizes and staggered destination addresses may be responsible for much of the improvement in throughput on the network, even if the destination address sequences are not actually random.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects. All such forms may be generally referred to herein as a "system." Furthermore, aspects of the present invention may take the form of a computer program product embodied in one or more computer readable storage medium(s) having computer readable program code embodied thereon.

A computer readable storage medium may be any tangible medium that can contain, or store a program for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing. More specific examples of the computer readable storage medium include, but are not limited to, the following: a portable computer diskette, a hard disk, a random access memory (RAM), a read-only memory (ROM), an erasable programmable read-only memory (EEPROM, EPROM, Flash memory), an optical fiber, a portable compact disc read-only memory (CD-ROM), an optical storage device, a magnetic storage device, or any suitable combination of the foregoing. Program code embodied on a computer readable storage medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

Aspects of the present invention are described herein with reference to flowchart illustrations and block diagrams of methods, apparatus (systems), and computer program products in accordance with embodiments of the invention. Each block of the flowchart illustrations and block diagrams, and combinations of blocks in the flowchart illustrations and block diagrams can be implemented by computer program instructions.

Computer program instructions may be provided to a processor of a general purpose computer, special purpose computer, or other programmable data processing apparatus to produce a machine, such that the instructions, which execute via the processor of the computer or other programmable data processing apparatus, create means for implementing the functions, acts, or operations specified in the flowchart and block diagram block. Computer program instructions may also be stored in a computer readable storage medium that can direct a computer, other programmable data processing apparatus, or other devices to function in a particular manner, such that the instructions stored in the computer readable medium produce an article of manufacture including instructions which implement the function, act, or operation specified in the flowchart and block diagram block.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions, acts, or operations specified in the flowchart or diagram block.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of program code, which comprises one or more executable instructions for implementing the specified logical function(s). The functions noted in the blocks may occur out of the order noted in the FIGS. For example, two blocks shown in succession may be executed substantially concurrently, or the blocks may sometimes be executed in the reverse order, depending upon the functionality involved. In addition, each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

While the invention has been shown and described with reference to specific preferred embodiments, it should be understood by those skilled in the art that various changes in form and detail may be made therein without departing from the spirit and scope of the invention as defined by the following claims.

What is claimed is:

1. A packet-switching communication network, comprising:
a plurality of processor nodes operating concurrently in parallel, each processor node generating messages to be sent simultaneously to a plurality of other processor nodes in the communication network, each message being divided into a plurality of packets having a common destination processor node, each processor node having an arbiter that determines an order in which to forward the packets from that processor node onto the communication network toward their destination processor nodes and a network interface that sends the packets onto the network in accordance with the determined order, the arbiter of each processor node substantially avoiding selecting two packets consecutively from any one of the messages when determining the order in which to forward the packets from that processor node onto the communication network, the order determined by the arbiter of each processor node operating to substantially avoid sending consecutive packets from a given source processor node to a given destination processor node and to randomize the destination processor nodes of those packets presently traversing the communication network.

2. The packet-switching communication network of claim 1, further comprising a router that routes each packet received by the router towards its destination processor node in accordance with a shortest path only algorithm.

3. The packet-switching communication network of claim 1, wherein the arbiter of each processor node determines the order in which to forward the packets by selecting a packet from each message in round-robin fashion.

4. The packet-switching communication network of claim 3, wherein each of the processor nodes starts with a different message from each of the other processor nodes when selecting a packet from each message in round-robin fashion.

5. The packet-switching communication network of claim 1, wherein the arbiter of each processor node determines the order in which to forward the packets by randomly selecting a message from which to take a packet.

6. The packet-switching communication network of claim 1, wherein the order in which to forward the packets is pseudo-random.

7. The packet-switching communication network of claim 1, wherein the order in which to forward the packets has an effect of randomizing packet routing throughout the communication network.

8. The packet-switching communication network of claim 1, wherein, when determining the order, the arbiter selects a first packet from each message before selecting a second packet from each message.

9. The packet-switching communication network of claim 1, wherein each processor node receives a fixed-size message having a plurality of packet slots, removes each packet addressed to that processor node from a packet slot, and inserts a packet addressed to a destination processor node into an empty packet slot.

10. The packet-switching communication network of claim 1, wherein each processor node takes priority of a packet into consideration when determining the order.

11. The packet-switching communication network of claim 1, wherein the processor nodes are cooperatively performing parallel processing of a graph algorithm.

12. The packet-switching communication network of claim 1, wherein the determined order further operates to substantially avoid sending near-consecutive packets from a given source processor node to a given destination processor node.

13. A processor node in a parallel multiprocessor system, comprising:
a processor generating messages to be sent simultaneously to a plurality of destination processor nodes over communication links in a packet-switching communication network, the processor dividing each message into a plurality of packets having a common destination processor node;
an arbiter determining an order in which to forward the packets onto the packet-switching communication network toward their destination processor nodes, the arbiter substantially avoiding selecting two packets consecutively from any one of the messages when determining the order in which to forward the packets onto the packet-switching communication network; and
a network interface sending the packets onto the network in accordance with the determined order, the determined order operating to substantially avoid sending consecutive packets from the processor node to a given destination processor node and to randomize the destination processor nodes of those packets presently traversing the communication network.

14. The processor node of claim 13, further comprising a router that routes each packet toward its destination processor node in accordance with a shortest path only algorithm.

15. The processor node of claim 13, wherein the arbiter determines the order in which to forward the packets by selecting a packet from each message in round-robin fashion.

16. The processor node of claim 15, wherein the arbiter starts with a different message from each other processor node in the communication network when selecting a packet from each message in round-robin fashion.

17. The processor node of claim 13, wherein the arbiter determines the order in which to forward the packets by randomly selecting a message from which to take a packet.

18. The processor node of claim 13, wherein the order in which to forward the packets is pseudo-random.

19. The processor node of claim 13, wherein the order in which to forward the packets has an effect of randomizing packet routing throughout the communication network.

20. The processor node of claim 13, wherein, when determining the order, the arbiter selects a first packet from each message before selecting a second packet from each message.

21. The processor node of claim 13, wherein the network interface receives a fixed-size message having a plurality of packet slots, removes each packet addressed to the processor node from a packet slot, inserts a packet addressed to a destination processor node into an empty packet slot, and forwards the message.

22. The processor node of claim 13, wherein the arbiter takes priority of a packet into consideration when determining the order.

23. The processor node of claim 13, wherein the determined order further operates to substantially avoid sending near-consecutive packets from a given source processor node to a given destination processor node.

24. In a parallel multiprocessor system, a method for exchanging messages among processor nodes interconnected by a packet-switching communication network, the method comprising:

identifying data to be sent simultaneously to a plurality of destination processor nodes;

generating a message for each destination processor node of the plurality of destination processor nodes for carrying the data to that destination processor node;

dividing each message into a plurality of packets having a common destination processor node;

determining an order in which to forward the packets onto the communication network toward their destination processor nodes that substantially avoids sending consecutive packets from a given source processor node to a given destination processor node and randomizes the destination processor nodes of those packets presently traversing the communication network by substantially avoiding selecting two packets consecutively from any one of the messages when determining the order in which to forward the packets from that processor node onto the communication network.

25. The method of claim 24, further comprising routing each packet toward the destination processor node of that packet in accordance with a shortest path only algorithm.

26. The method of claim 24, wherein determining the order in which to forward the packets includes selecting a packet from each message in round-robin fashion.

27. The method of claim 24, wherein determining the order in which to forward the packets includes randomly selecting each message from which to take a packet.

28. The method of claim 24, wherein the order in which to forward the packets is pseudo-random.

29. The method of claim 24, wherein the order in which to forward the packets has an effect of randomizing packet routing throughout the communication network.

30. The method of claim 24, wherein determining the order includes selecting a first packet from each message before selecting a second packet from each message.

31. The method of claim 24, wherein the order in which to forward the packets further operates to substantially avoid sending near-consecutive packets from a given source processor node to a given destination processor node.

* * * * *